(12) United States Patent
Oberle

(10) Patent No.: US 8,794,096 B2
(45) Date of Patent: Aug. 5, 2014

(54) GEARWHEEL AND METHOD FOR MANUFACTURING A GEARWHEEL

(75) Inventor: Stephan Oberle, Villingen-Schwenningen (DE)

(73) Assignee: IMS Gear GmbH, Eisenback (DE)

( * ) Notice: Subject to any disclaimer, the term of this patent is extended or adjusted under 35 U.S.C. 154(b) by 0 days.

(21) Appl. No.: 12/841,196

(22) Filed: Jul. 22, 2010

(65) Prior Publication Data

US 2011/0011195 A1   Jan. 20, 2011

Related U.S. Application Data

(62) Division of application No. 11/582,553, filed on Oct. 18, 2006, now abandoned.

(30) Foreign Application Priority Data

Oct. 19, 2005   (DE) .......................... 10 2005 050 438

(51) Int. Cl.
*F16H 55/12* (2006.01)
*F16H 55/14* (2006.01)

(52) U.S. Cl.
USPC ............................................. 74/446; 74/443

(58) Field of Classification Search
USPC ........ 74/431, 434, 446, 443, DIG. 10; 29/893
See application file for complete search history.

(56) References Cited

U.S. PATENT DOCUMENTS

| 4,589,860 A | * | 5/1986 | Brandenstein et al. ....... 474/161 |
| 5,722,295 A | | 3/1998 | Sakai et al. |
| 6,557,663 B2 | | 5/2003 | Kurokawa et al. |
| 6,644,431 B2 | | 11/2003 | Kuze et al. |
| 6,868,607 B2 | | 3/2005 | Kuze et al. |
| 7,117,598 B2 | | 10/2006 | Prucher |
| 7,475,612 B2 | | 1/2009 | Kaneiwa et al. |
| 2002/0043124 A1 | | 4/2002 | Shiga et al. |
| 2002/0078777 A1 | | 6/2002 | Witucki et al. |
| 2005/0247151 A1 | | 11/2005 | Yamamoto et al. |

FOREIGN PATENT DOCUMENTS

| DE | 39 42 761 C2 | 8/1991 |
| DE | 101 27 224 A1 | 12/2002 |
| JP | 8-145146 A | 6/1996 |
| JP | 2001-116052 A | 4/2001 |
| WO | 2004/065824 A1 | 8/2004 |

* cited by examiner

*Primary Examiner* — Justin Krause
(74) *Attorney, Agent, or Firm* — Nath, Goldberg & Meyer; Jerald L. Meyer

(57) ABSTRACT

The invention concerns a gearwheel (1) with a gear rim (2) and an insert (3) whose external diameter (d3) is greater than half of the external diameter (d1) of the gearwheel (1), wherein the insert (3) is surrounded by injection molding by means of a cone mold during the manufacture of the gearwheel. In particular, the gear rim (2), including gear teeth on the external circumference, is formed at the same time during the injection molding process.

7 Claims, 7 Drawing Sheets

Figure 1:
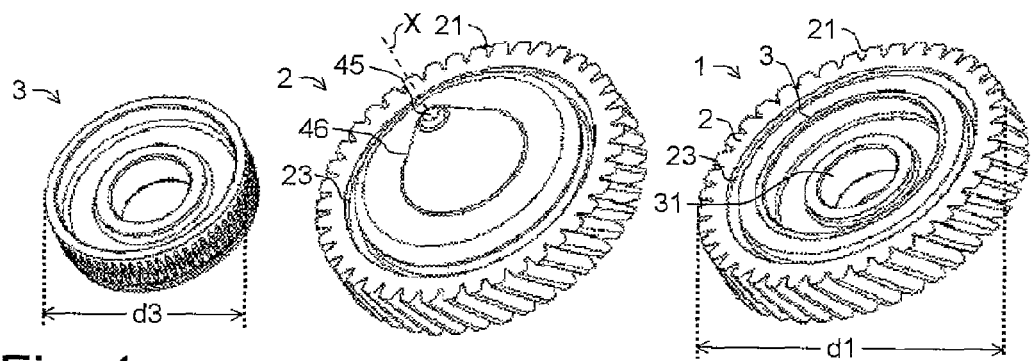

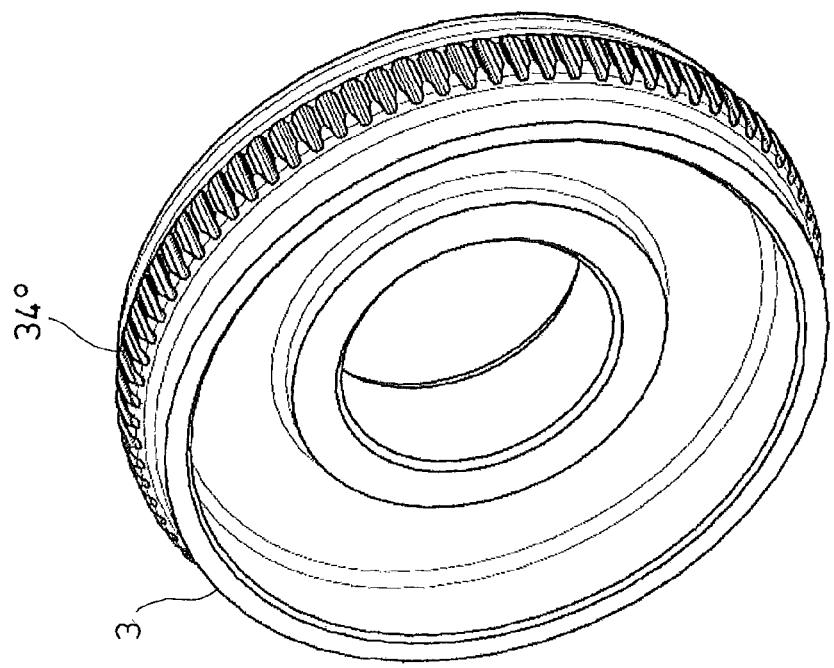
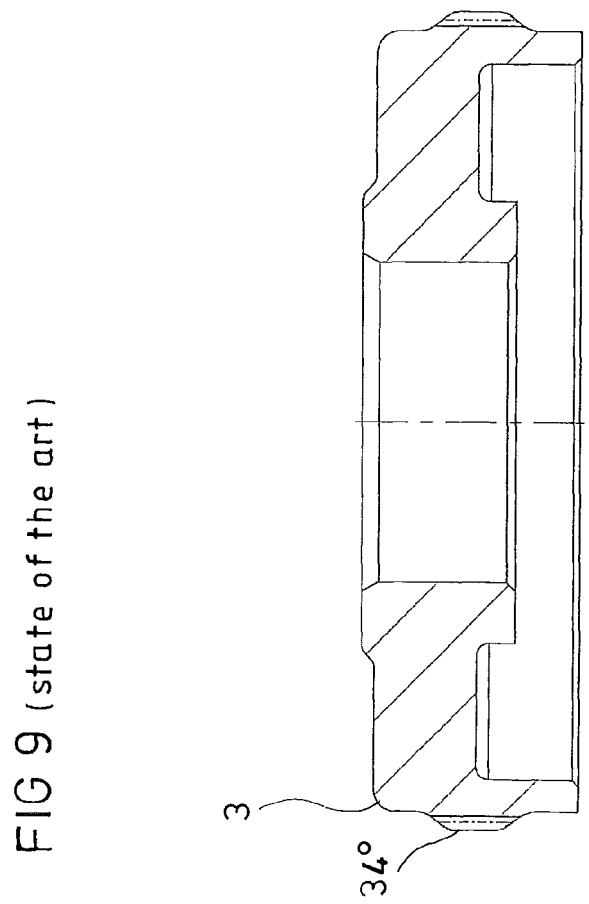
FIG 9 (state of the art)

FIG 11 (state of the art)
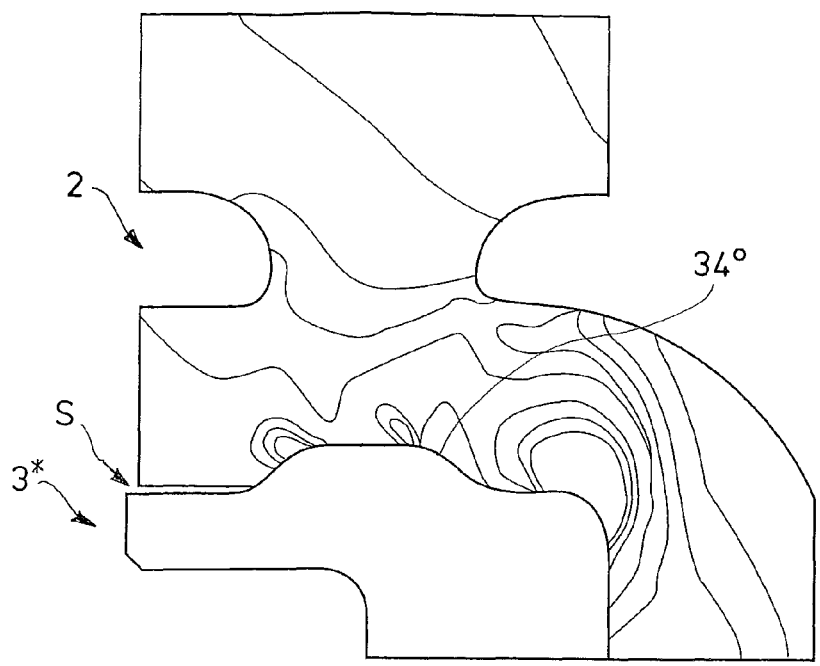
FIG 10 (state of the art)
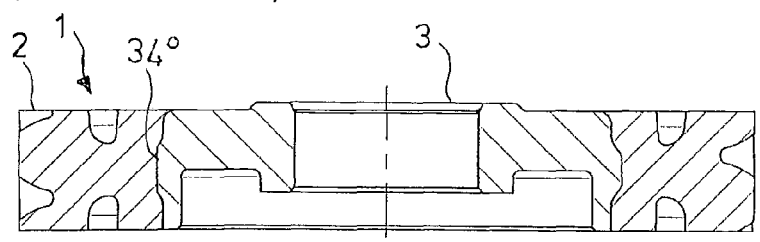
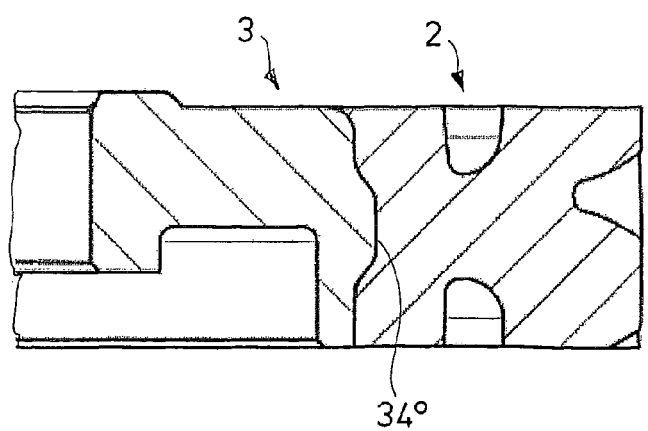

GEARWHEEL AND METHOD FOR MANUFACTURING A GEARWHEEL

This application is a divisional of and claims priority to U.S. application Ser. No. 11/582,553, filed Oct. 18, 2006, and also claims priority to German application DE 10 2005 050 438.8, filed Oct. 19, 2005, both of which are hereby incorporated by reference in their entirety.

The invention concerns a gearwheel with the generic characteristics of claim 1 and a method for manufacturing a gearwheel with the generic characteristics of claim 11.

Gearwheels of the prior art include, for example from the field of power steering, so-called EPAS (EPAS: Electric Power Assisted Steering) gearwheels that have as a central element a large metal hub that is bonded with an external molded polyamide ring. A large metal hub in this instance is understood to refer to a metal hub whose external diameter is greater than half of the exterior diameter of the gearwheel. Gear teeth are then formed on the gear rim through machining of the molded polyamide ring material. This type of manufacturing process is expensive because a large number of expensive work steps are required. Another disadvantage is the fact that a bonded connection between the external circumference of the metal hub forming the insert of such a gearwheel and the gear rim surrounding the insert provides only a conditionally solid fit in the event of impacting forces in the circumferential or rotational direction and in directions parallel to the axis.

Surrounding an insert by injection molding with plastic when manufacturing a gearwheel in order to form the gear rim is also of the prior art. In particular, if the gear teeth are formed at the same time during the process, then the gear teeth are prevented from freely shrinking when the molded plastic is cooled, which places the plastic ring under permanent tensile stress. A large insert also largely reduces shrinkage tension if it is surrounded with plastic through injection molding. Such shrinkage tensions have an effect in the radial and axial direction, and in particular generate the risk of gear breakage.

FIG. 9 shows a perspective view and a sectional view of an insert based on the state of the art, in which protrusions form in the circumferential area in the radial direction of the insert, which in the manner of a gear tooth are intended to positively engage with a surrounding material of a gear ring. FIG. 10 shows two other related sectional views that also show a gear ring. As is evident from FIG. 11, if material is injected from a gate located in an axial direction of the gearwheel being formed, material would flow out around such 34° protrusions. However, when the casting material is cooled or hardened, a fissure S between the gear rim 2 formed in this manner and the insert 3* is created on the side of the 34° protrusions facing on the side opposite the molding injection point.

The objective of the invention is to provide a gearwheel with a simple structure whose individual components are also well attached. Accordingly, a method for manufacturing a gearwheel shall also be proposed that permits the production of such a gearwheel.

This objective is achieved by a gearwheel with the characteristics of claim 1 and by a method to manufacture a gearwheel with the characteristics of claim 11. The dependent claims involve advantageous embodiments.

In particular, therefore, a gearwheel is preferred with a gear rim and with an insert whose exterior diameter is greater than half of the external diameter of the gearwheel, with the insert being surrounded by injection molding using a cone mold or surrounded by injection molding during manufacture in accordance with the method.

It is clear that such a connecting part permits counter-gripping structures that provide especially strong engagement to oppose rotational forces and forces parallel to the axis due to a deep penetration into the external part and the insert. This allows counter-gripping structures that penetrate deeper into the external part and into the insert than is possible with conventional individual components, which are inserted into one another based upon their specific manufacture.

The gear rim is (preferably) formed by means of the cone mold as a component surrounding the insert. Compared to the injection molding of the prior art, this avoids seams that would be created if plastic were injected from several injection points located in a radial direction around the circumference. The lack of such seams results in increased stability in the rotational direction of such a preferred gearwheel.

The gear rim (including an external gear structure) is preferably formed by means of the cone mold. Forming the external gear structure together with the elements of the gear rim obviates the need for a subsequent milling process to create gear teeth from a solid piece, and thus obviates the need for a completely independent manufacturing step.

The insert can have indentations facing outwards toward the gear rim into which the gear rim material penetrates. Such indentations are thus external; i.e., they are formed on a radial exterior side of the insert facing the gear rim. At least one part of the indentations is preferably formed as a globoid-like indentation. Such globoid-like indentations in particular permit especially effective inflows of gear rim material, which also prevents formation of fissures between gear rim and insert.

The insert preferably has off-center protrusions on the exterior of the gear rim, which penetrate into the material of the gear rim. Such protrusions are external; i.e., they are formed on a radial exterior side of the insert facing the gear rim. Preferably at least one part of the off-center protrusions extends with an oblong extension transverse to a rotational direction. This permits a large positive contact surface for good force transfer between the gear rim and the insert. At least one part of such off-center protrusions is preferably displaced off-center to the gate side of the cone mold.

The insert is preferably made from metal and the external part from plastic. Alternatively, the insert can also be surrounded by injection molding with a metallic substance.

It is preferable to create a lateral molded part by means of the cone mold on the side of an insert wall in the axial direction of the insert. A lateral molded part created in the axial direction by means of the cone mold is preferably then removed. The gear rim (including an external gear structure) is preferably already formed by means of a cone mold.

However, a gearwheel can also be formed with an external part formed by the gear rim, with an insert, and with one or more connecting elements to create a form-fitting connection between the external part and the insert, whereby the (at minimum one) connecting element is formed from a material that is injected between the external part and the insert.

The components that are injection molded by means of a cone mold, preferably with gear tooth structures that prevent pulling in the rotational direction and/or in a direction parallel to the axis, preferably engage with the insert and/or the external part, which creates good rotational stability and/or stability against shifting parallel to the axis for the insert and the external part relative to one another. Such gear tooth structures can be formed especially advantageously by indentations and by protrusions placed off-center on the external circumference of the insert, which permits a form-fitting connection between the insert and the surrounding material created by means of a cone mold.

This type of manufacturing process thus creates a gearwheel that can be used in particular as an EPAS gearwheel. The gearwheel advantageously consists of a metal hub in the form of a metal insert or insert part, which is surrounded by injection molding with plastic in a molding process (including the gear teeth) to form the gear rim. This eliminates the need for expensive and time-consuming finishing of the gear teeth.

Injection molding using a cone mold method creates a high level of stability on the gear rim because the rim has no seam line and thus no pre-established break-off point.

Thus injection molding is advantageously accomplished using the piece formed by the cone mold, which is then removed, for example in a machining process. This allows lateral cone mold residue to be removed by machining in a simple work step, in contrast to a multitude of individual steps when individual gears are machine-formed in the circumferential area of the gear rim.

It is also advantageous for the cone gate to be designed with very thick walls, particularly with a width on the side of the insert of more than 60%, particularly from approximately 60% up to 150%, of a maximum wall thickness of the gear rim, in order to be able to fill the gear rim without holes or bubbles during injection molding.

Indentations and protrusions in the transitional area between the insert and the gear rim, wherein the gear rim is understood here to refer also to a ring-shaped section formed between the actual gears and the insert part, permit good torsional synchronization and axial force transfer because of the form-fitting connection with the hub that is created thereby.

Such a component, including the cone gate, typically also exhibits high axial stresses. The cone gate pulls the gear rim ring axially in the direction of the cone gate. As a result, protrusions on the side of the steel-hub shaped insert opposite to the gate cause the gear rim to expand and the insert to detach from the gear rim. Thus, it is advantageous to provide locking mechanisms, particularly in the form of protrusions set off-center on the gate side of the external circumference of the insert. Preferably only indentations are provided on the side on the insert opposite to the gate, particularly on its external circumference, so that detachments can be avoided to the extent possible.

Figure 2:
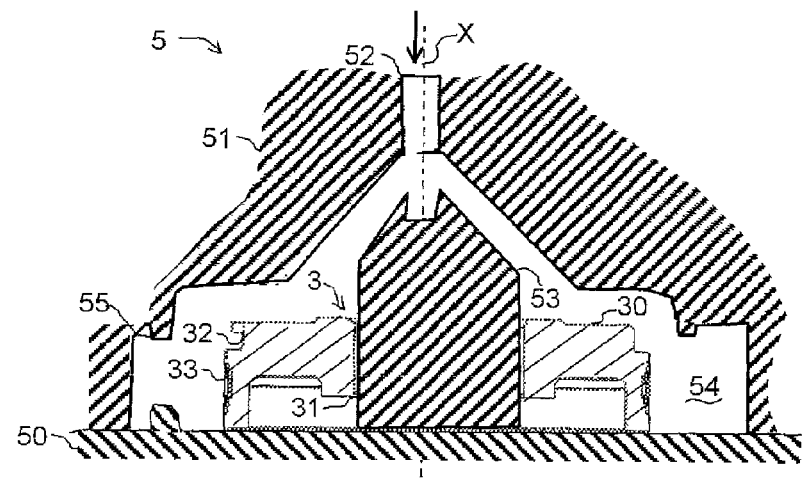
Figure 2:
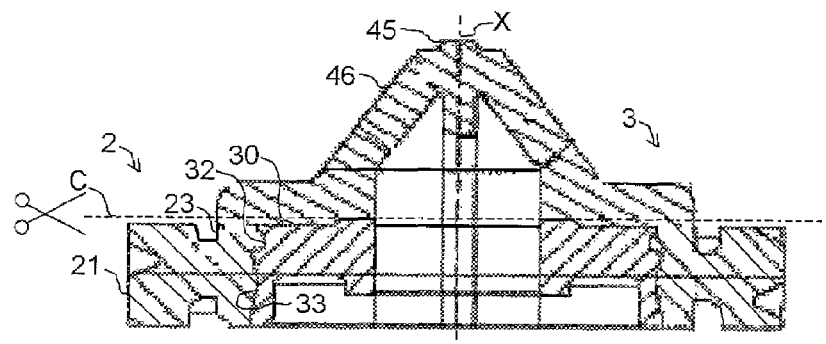
Figure 2:
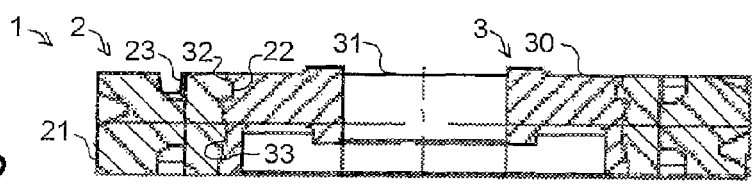
Figure 3:
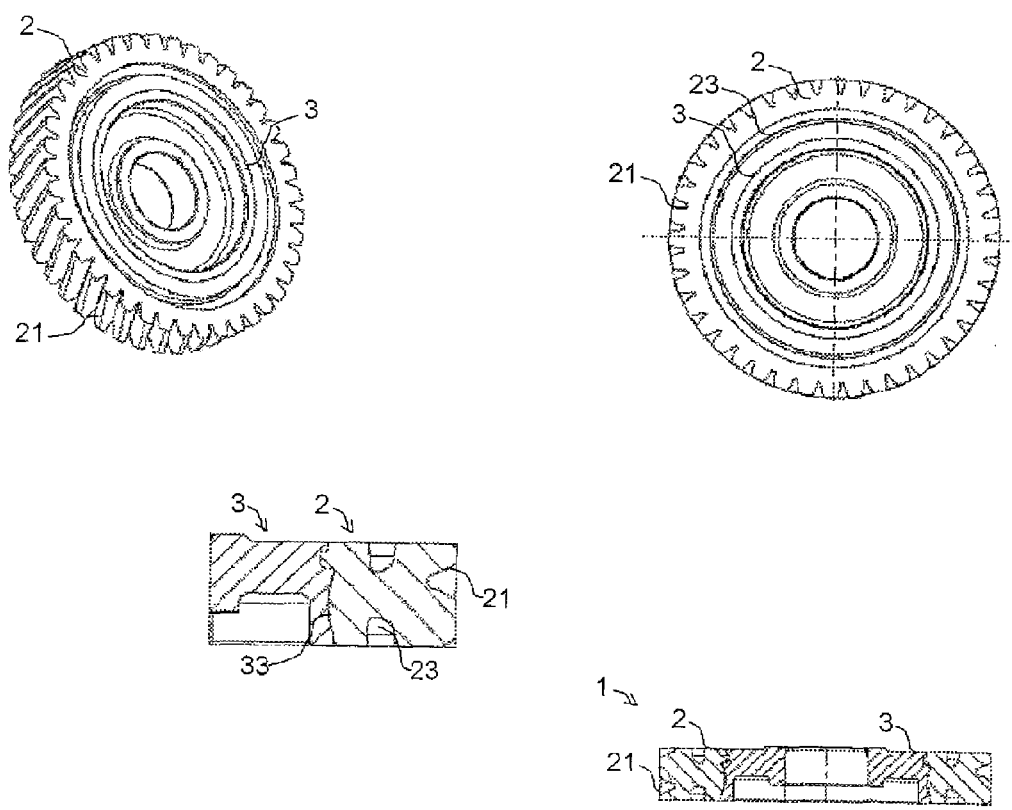
Figure 4:
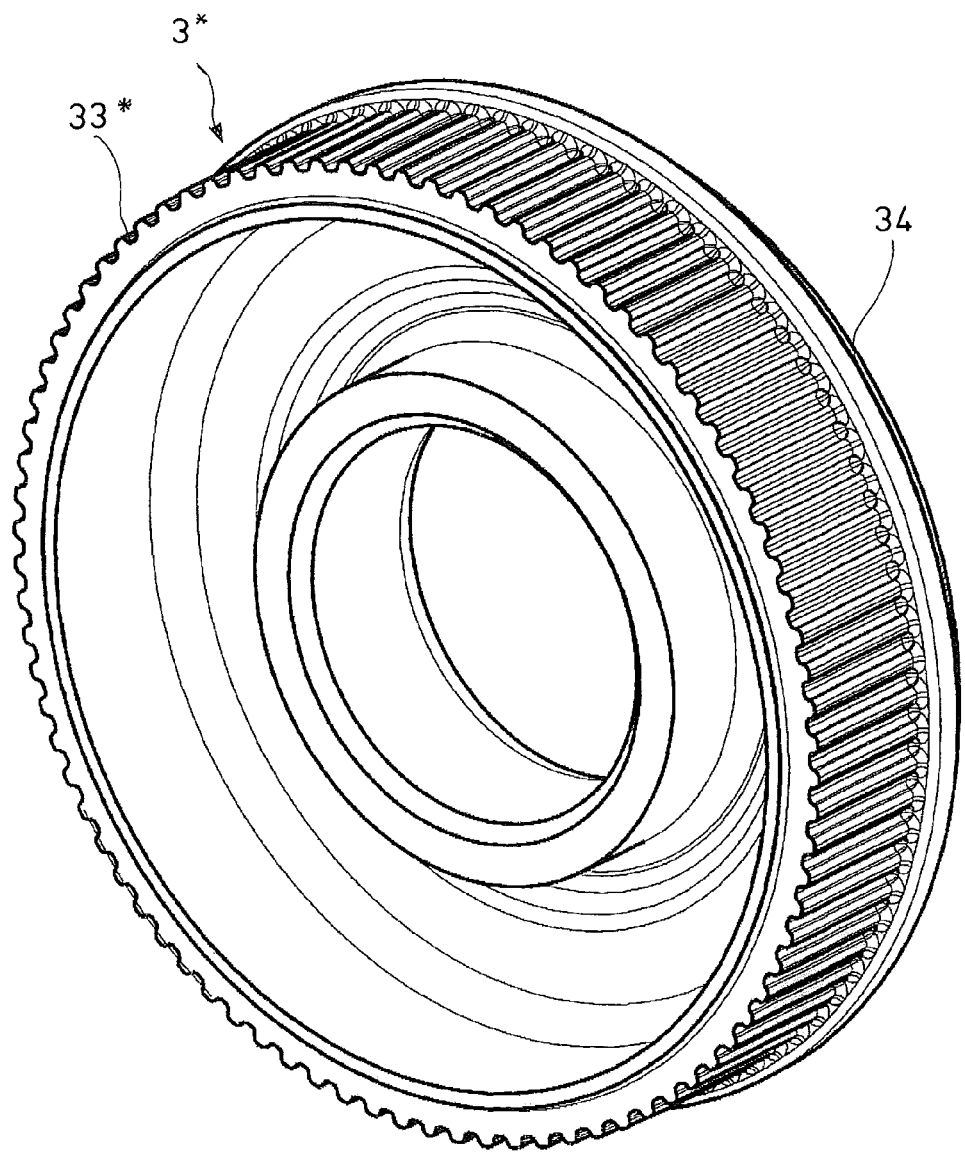
Figure 5:
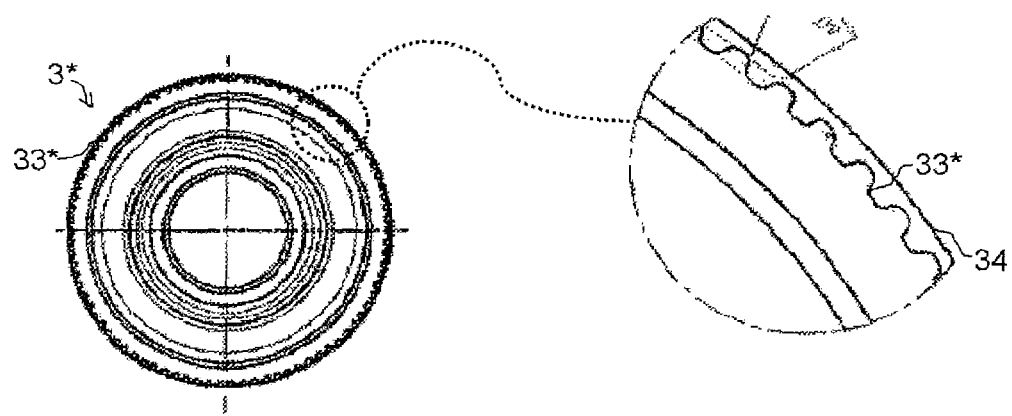
Figure 6:
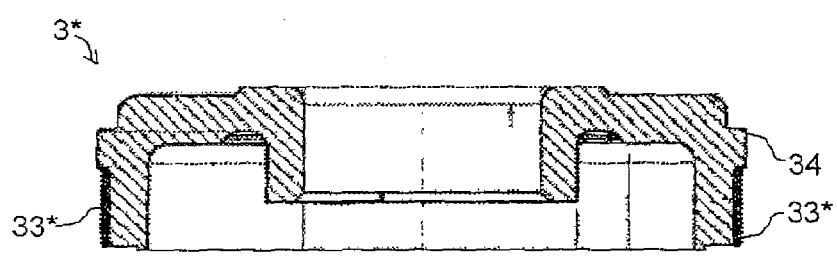
Figure 7:
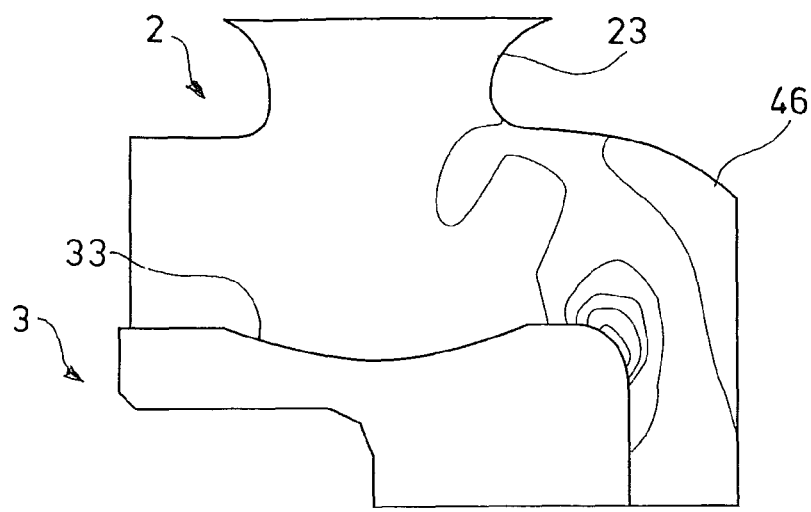
Figure 8:
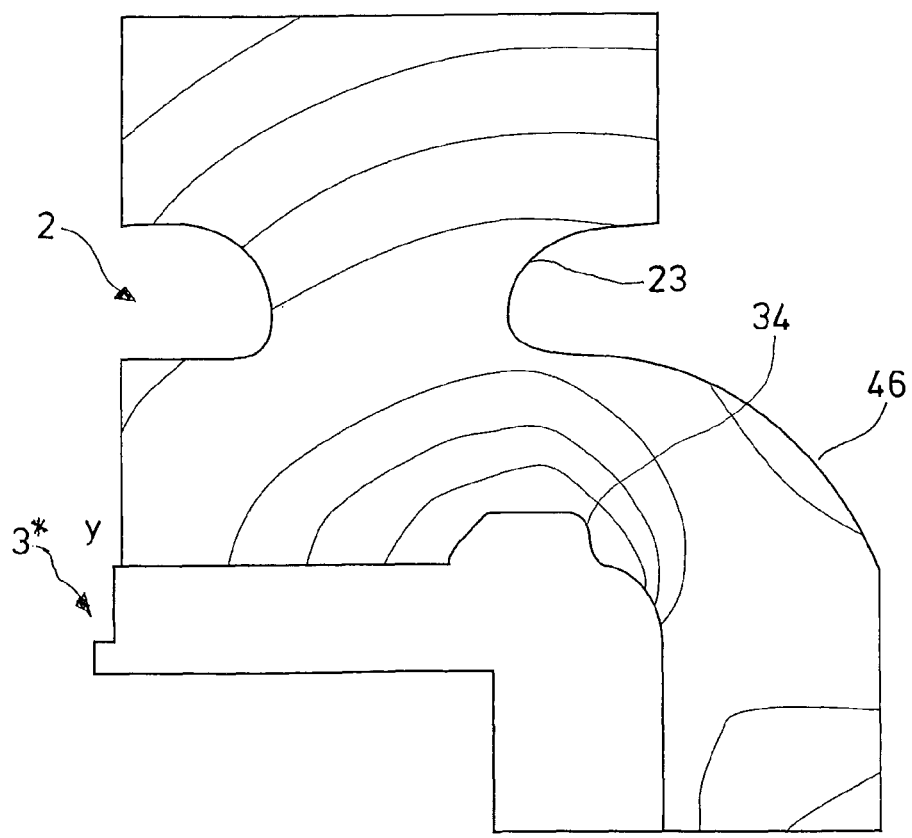

The figures below detail an exemplary embodiment. To the extent that some of the figures use the same reference numbers, this means that the same or similarly acting components or functional characteristics are involved in each case. The descriptions of other figures can then be taken into consideration. The figures are:

FIG. 1 Components of three manufacturing steps of a gearwheel in a perspective lateral view;

FIG. 2 Components of three manufacturing steps of a gearwheel in a lateral sectional view;

FIG. 3 Various perspective views and sectional views of an exemplary gearwheel according to FIG. 1 and FIG. 2;

FIG. 4 A perspective view of an insert according to an embodiment with off-center protrusions on the external circumference;

FIG. 5 A lateral view and a sectional enlargement of the insert according to FIG. 4 in order to visualize such protrusions on the circumferential area;

FIG. 6 An enlarged sectional view through the insert according to FIG. 4 and FIG. 5, FIG. 7 An enlarged partial sectional representation as a stress diagram through a transitional area between an insert with a depression and a gear rim injection molded onto it by means of a cone mold;

FIG. 8 An enlarged sectional representation of a stress diagram in the event of an off-center protrusion on the external circumference of the insert;

FIG. 9 A perspective lateral view and a sectional view of an insert with protrusions on the center of the external circumference according to the state of the art;

FIG. 10 Another sectional representation and a sectional enlargement in the section of the embodiment according to FIG. 9 with a gear rim injection molded in the circumferential direction according to the state of the art; and FIG. 11 A stress diagram of an enlarged section of one such embodiment with an protrusion on the center of the external circumference of the insert according to the state of the art.

As shown by FIG. 1, an exemplary gearwheel 1 is manufactured in several manufacturing steps. In an initial manufacturing step, an insert 3 that forms the actual hub is created. The insert 3 is preferably a metal (particularly steel) insert that is used to form, for example, a steel hub that is itself of the prior art.

In a subsequent manufacturing step, this insert 3 is surrounded by means of injection molding to form a gear rim 2, with a cone mold process being used for the injection molding. Accordingly, the center drawing shows the insert completely surrounded by the injection molded plastic in the line of sight. This insert already exhibits a gear structure 21 in the circumferential direction. A gear structure 21 of this type can be cast at the same time. In the cone mold injection process, the insert 3 is surrounded by injection molding from the axial direction of an axis X that preferably forms the rotational axis of the gearwheel. The view shows the side from which the insert 3 is surrounded by injection molding, with the center drawing showing an intermediate manufacturing step in which a cone gate 46 is still in place on the side of the insert. A sprue 45 is visible in the center or axially.

The cone gate 46 covers a side wall of the insert 3 extending in the axial direction with a thickness that permits bubble-free injection molding even of areas that are remote from the gate. The thickness of the casting material in the axial direction lateral to the insert 3 is preferably more than 60%, particularly approximately 60% up to 150% of the maximum thickness of the axial extension of the gear rim 2 that is to be formed. However, depending in particular upon the fluid behavior of the material used during the cone molding process, a smaller or greater thickness may be required to achieve an optimal result.

A cone mold also particularly permits the formation of a groove 23 or similarly indented structures in an axially extending side wall of the gear rim 2 formed by the injection molding.

The cone gate 46 below is then separated from the side of the insert 3, for example using a machining process. This ultimately produces the gearwheel shown on the right side of FIG. 1, which shows the central insert 3 with a central shaft seat, wherein the insert 3 has already been surrounded by injection molding in the circumferential direction to create the finished gear rim 2, including a gear structure 2 and, if necessary, groove-shaped structures such as the groove 23.

In a comparison of the left and right drawings in FIG. 1, it is clear that such a method specifically also permits the manufacture of gearwheels 1 with a large insert 3. A large insert 3 refers to an insert 3 whose external diameter d3 is greater than half of the external diameter d1 of the finished gearwheel 1.

FIG. 2 shows in a sectional view three manufacturing steps (arranged vertically) for manufacturing such a gearwheel 1. The top drawing shows the insert 3 on a supporting surface 50 or the lower part of a tool 5. An insert is placed into the shaft seat 31 of the insert 3, which prevents injection molding material from flowing in during the injection molding process. The upper part of a tool 51 is placed on the supporting surface 50 at a distance above and in the circumferential direction outside of the insert 3. This therefore creates an injection molding area 54 in which a cone gate 46 is formed during the injection molding of the gear rim 2 as well as in the axial direction lateral to a side wall 30 of the insert 3. The upper part of tool 51 has an injection channel 52 for injecting the injection molding material, wherein the injection channel 52 preferably runs in the center and in an axial direction to the axis X of the gearwheel to be formed. The upper part of tool 51 and the supporting surface 50 preferably already have tool structures 55 that are shaped appropriately so as to form, for example, the groove 23 and a gear structure.

As shown by the center drawing in FIG. 2, therefore, an element that is injection molded with such a configuration consists of the insert 3, which is surrounded by injection molding by the gear rim 2 in the circumferential direction and by the cone gate 46 in the axial and lateral direction. The insert 3 has gear tooth structures on its surface in a circumferential direction that serve to form a form-fitting connection between the external circumference of the insert 3 and the internal circumference of the gear rim 2. Shown as geared structures are two different types of indentations 32 and 33, which are formed radially on the external circumferential wall of the insert 3, and which are filled with the injection molding material during the injection molding process. An initial indentation 32 is formed, for example, as a groove running in a circumferential or rotational direction in order to form a stabilizing or retaining gear tooth structure in the axial direction of the axis X. This initial indentation 32 is formed off-center on the external circumference of the insert 3 and faces the gate side off-center on the external circumference of the insert 3.

A large number of secondary indentations 33 are formed parallel to the axis X and are preferably globoid in shape. After the injection molding material flows in and hardens, this large number of secondary indentations 33 causes a form-fitting connection to the gear rim 2, which permits a good transfer of force in the rotational direction.

After separating along a separation line C, for example by means of a machining process, the finished gearwheel 1, which is shown in FIG. 2 below, is created.

FIG. 3 shows other views and details of the gearwheel 1 shown in FIG. 2.

FIGS. 4 through 6 show an embodiment that has been modified compared to the previous figures. Instead of an initial indentation in the form of a circumferential groove (32 in FIG. 1), off-center protrusions 34 are formed on the circumferential surfaces of the insert 3* that are external in a radial direction, which after molding engage with the hardened material of the gear rim. At the same time, these protrusions 34 are arranged off-center towards a gate side for the gear rim in order to prevent the molding material from detaching when it hardens during the setting and cooling process. Here such protrusions 34 can run in a circumferential direction as shown so as to create a form-fitting connection between the insert 3* and the gear rim in the axial direction of the axis X.

The insert 3* preferably again has axis-parallel indentations 33* in a circumferential section adjacent to the protrusion 34 that are oblong, for example, and not globoid-shaped in the shown embodiment. At the same time, the radii of these indentations 33* are selected so that the injection molding material can flow into them during the injection molding process and detachment during the subsequent hardening process can be prevented completely, or at least to the greatest extent possible.

FIG. 7 shows a stress diagram for a circumferential section of the transitional area between the insert 3 and the gear rim 2 after injection molding using the cone mold and before a lateral cone gate is removed. Particularly compared with FIG. 11, which shows an embodiment based upon the state of the art, FIG. 7 clearly shows an advantageous stress pattern that prevents the hardened plastic material of the gear rim from detaching in a section far from the injection point. The hardening causes the material, preferably plastic, to pull back only in the direction of the gate or the gate side, as is clearly shown, although this does not result in any detachment, or any significant detachment, from the circumferential areas of the insert 3.

FIG. 8 shows a stress diagram of a corresponding section of the transitional area between the insert 3* and the gear rim 2 of the embodiment according to FIGS. 4 through 6. It is also clear that shrinking occurs during the hardening or cooling of the plastic mass of the gear rim 2, which leads to a displacement on the end facing away from the gate. Nevertheless, fissures do not form, or form only to a harmless extent, when the plastic that constitutes the molding material detaches from the adjacent surfaces of the insert 3*.

The invention claim is:

1. A gear wheel, comprising:
    a gear rim;
    an insert whose external diameter is greater than a half of an external diameter of the gear wheel, the insert having first and second opposing sides, the insert coated by extrusion by means of a diaphragm gate, with the first opposing side facing the diaphragm gate;
    a single circumferential groove on a lateral portion of the first opposing side, the groove having first and second side walls and facing the gear rim so as to fill with injection molding material during an injection molding process forming the gear rim, the groove running in a rotational direction in order to form a stabilizing or retaining gear tooth structure in the axial direction of an axis of the insert to stabilize the gear rim; and
    a plurality of indentations on a lateral portion of the second opposing side, the plurality of indentations formed in a circumferential direction parallel to an axis of the insert so as to fill with the injection molding material during said injection molding process forming the gear rim, to cause a form-fitting connection to the gear rim, thereby enhancing transfer of force in the rotational direction,
    wherein the plurality of indentations faces the gear rim and at least a portion of the gear rim material penetrates into the plurality of indentations.

2. The gear wheel according to claim 1, wherein at least a portion of the plurality of indentations is globoid-shaped.

3. The gear wheel according to claim 1, wherein the insert is made of metal and an external part of the gear rim is made of plastic.

4. The gear wheel according to claim 1, wherein the insert is surrounded by injection molding with a metallic substance.

5. A gear wheel, comprising
    a gear rim;
    an insert, whose external diameter is greater than a half of an external diameter of the gear wheel, and the insert coated by extrusion by means of a diaphragm gate,
    wherein the diaphragm gate is arranged to face the insert first side;

a plurality of circular off-center radially-extending protrusions on an external circumference of the insert, the plurality of protrusions facing toward the gate; and a plurality of indentations in an external circumference of the insert formed in a direction parallel to an axis of the insert and facing the gear rim, the protrusions running in a rotational direction so as to create a form-fitting connection between the insert and the gear rim in an axial direction established by the axis, wherein:

the plurality of protrusions, after molding engage with hardened material of the gear rim, the protrusions arranged with respect to a gate side for the gear rim to penetrate into the material of the gear rim, in order to prevent the molding material from detaching when the molding material hardens during a setting and cooling process, and to cause a form-fitting connection to the gear rim, which permits a transfer of force in the rotational direction, and the plurality of indentations arranged on the side of the plurality of protrusion that face away from the gate.

6. The gear wheel according to claim 5, wherein the insert is made of metal and an external part of the gear rim is made of plastic.

7. The gear wheel according to claim 5, wherein the insert is surrounded by injection molding with a metallic substance.

* * * * *

UNITED STATES PATENT AND TRADEMARK OFFICE
CERTIFICATE OF CORRECTION

| | | |
|---|---|---|
| PATENT NO. | : 8,794,096 B2 | Page 1 of 1 |
| APPLICATION NO. | : 12/841196 | |
| DATED | : August 5, 2014 | |
| INVENTOR(S) | : Oberle | |

It is certified that error appears in the above-identified patent and that said Letters Patent is hereby corrected as shown below:

On the title page please correct the city of the assignee from Eisenback to Eisenbach so that it appears as:
item (73) Assignee: IMS Gear GmbH, Eisenbach (DE)

Signed and Sealed this
Fourteenth Day of October, 2014

Michelle K. Lee
*Deputy Director of the United States Patent and Trademark Office*